Figure 1:
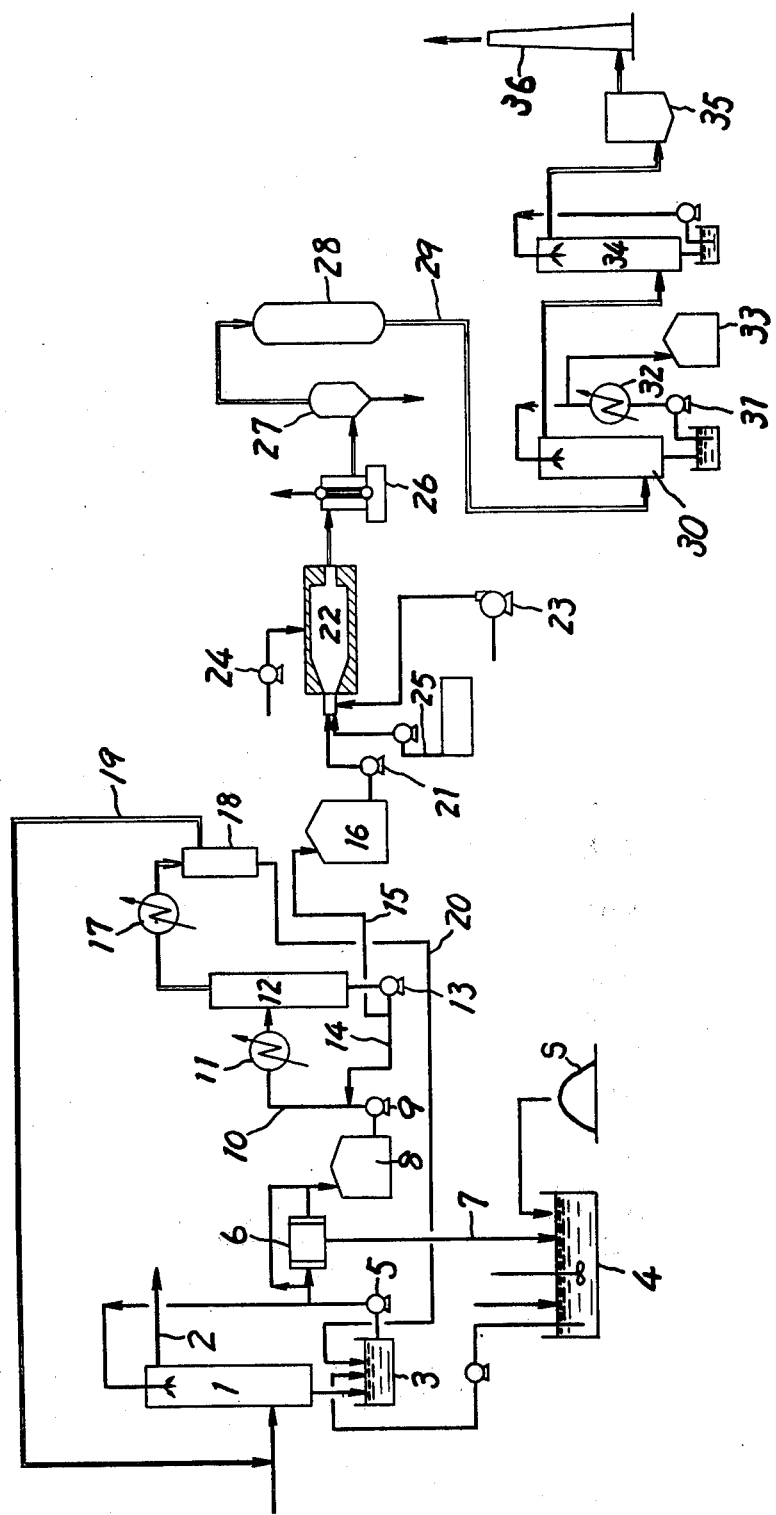

United States Patent [19]

Nogami et al.

[11] 4,062,931
[45] Dec. 13, 1977

[54] PROCESS FOR PURIFYING GASES

[76] Inventors: Yoshio Nogami, 7/12, 5-chome, Tsukumodai, Suita, Osaka; Isami Ooka, 18/11, Narita-Higashimachi, Neyagawa, Osaka; Tetsuo Hamamoto, 13/27/921, Kusunoki-cho, Ashiya, Hyogo; Hirofumi Shibano, 7/7, Furuno-cho, Kawachinagano, Osaka, all of Japan; Kenji Miyao, deceased, late of Nara, Japan by Mieko Miyao, legal heir, 3/23/3, Torimi-cho, Nara, Nara, Japan

[21] Appl. No.: 602,021

[22] Filed: Aug. 5, 1975

Related U.S. Application Data

[63] Continuation of Ser. No. 338,418, March 6, 1973, abandoned.

[51] Int. Cl.$^2$ .................. C01B 17/50; C01B 17/74
[52] U.S. Cl. ................................ 423/522; 423/234; 423/236; 423/541 A
[58] Field of Search ............... 423/222, 224, 226, 234, 423/236, 522, 523, 525, 539, 541, 541 A, 540, 336, 332

[56] References Cited

U.S. PATENT DOCUMENTS

| 1,542,971 | 6/1925 | Sperr, Jr. et al. | 423/232 |
| 2,621,108 | 12/1952 | Hill et al. | 423/366 |
| 3,086,838 | 4/1963 | Giammarco | 423/232 |
| 3,359,069 | 12/1967 | Furkert et al. | 423/541 A |
| 3,459,495 | 8/1969 | Ilda et al. | 423/226 |
| 3,682,593 | 8/1972 | Browder | 423/523 |

FOREIGN PATENT DOCUMENTS

| 665,527 | 6/1965 | Belgium | 423/541 A |
| 711,170 | 6/1965 | Canada | 423/224 |
| 1,806,003 | 5/1970 | Germany | 423/522 |

Primary Examiner—O. R. Vertiz
Assistant Examiner—Gary P. Straub
Attorney, Agent, or Firm—Larson, Taylor and Hinds

[57] ABSTRACT

In purifying a gas containing at least one of hydrogen cyanide and hydrogen sulfide as a harmful component by fixing the harmful component in water as an aqueous solution of nitrogen-containing sulfur compound so as to render the gas free of the harmful component, an improvement characterized by:
1. burning the aqueous solution of nitrogen-containing sulfur compound to obtain an exhaust gas containing sulfur dioxide,
2. separating the sulfur dioxide from the exhaust gas for recovery, and
3. exhausting the gas after the separation of the sulfur dioxide.

9 Claims, 2 Drawing Figures

PROCESS FOR PURIFYING GASES

This is a continuation of application Ser. No. 338,418 filed Mar. 6, 1973 now abandoned.

This invention relates to a process for purifying gases, more particularly to a process for effectively removing harmful components, especially hydrogen cyanide and hydrogen sulfide from gases without causing any pollution.

Various fuel gases, synthetic gases and waste gases [hereinafter referred to briefly as gases (or gas)] contain at least one of harmful components such as hydrogen cyanide and hydrogen sulfide. These harmful components cause environmental destruction through water or atmospheric pollution if discharged into water or air in the course of purifying gas and give rise to the corrosion of apparatuses for supplying and burning gases if not removed. Accordingly, processes have been proposed and practiced to purify gases by removing and recovering these harmful components therefrom.

According to one of the most conventional methods for purifying such gases, the harmful component contained therein is fixed in water in the form of nitrogen-containing sulfur compound dissolved therein. For example, the conventional processes are: (1) process wherein a gas containing hydrogen sulfide is washed with an aqueous ammonia solution of desulfurizing catalyst to fix the hydrogen sulfide in the solution as solid sulfur and ammonium thiosulfate, (2) process in which a gas containing hydrogen cyanide and hydrogen sulfide is washed with an aqueous alkaline solution of desulfurizing catalyst containing solid sulfur suspended therein to thereby fix them as thiocyanate and thiosulfate in the solution, and (3) process in which a hydrogen cyanide-containing gas is washed with an alkaline suspension of solid sulfur to fix the hydrogen cyanide in the washing liquid in the form of thiocyanate. With these processes, however, it is economically and technically difficult to completely recover from the washing liquids the fixed nitrogen-containing sulfur compounds such as thiocyanate and ammonium thiosulfate, so that the known processes involve the serious drawback that the nitrogen-containing sulfur compounds will be discharged into water systems to result in water pollution. Presently, moreover, there is no suitable method available for utilizing the above-mentioned nitrogen-containing sulfur compounds for industrial purposes.

Accordingly, a primary object of this invention is to provide a process for removing harmful components from gases without causing environmental pollution.

Another object of this invention is to provide a process for recovering harmful components from gases in a form suitable for useful applications.

These and other objects of this invention will become more apparent from the following description.

In purifying a gas containing at least one of hydrogen cyanide and hydrogen sulfide as a harmful component by fixing the harmful component in water in the form of nitrogen-containing sulfur compound dissolved therein so as to render the gas free of the harmful component, the method of the invention is characterized by:

1. burning the aqueous solution of nitrogen-containing sulfur compound to obtain an exhaust gas containing sulfur dioxide,
2. separating the sulfur dioxide from the exhaust gas from recovery, and
3. exhausting the gas after the separation of the sulfur dioxide.

Extensive researches carried out by the present inventors have revealed that in the case where nitrogen-containing sulfur compounds obtained by fixing hydrogen cyanide and/or hydrogen sulfide in water are burned in the form of aqueous solution, the compounds are converted to sulfur dioxide which can be recovered in the useful form of sulfuric acid, sulfate, sulfite, etc. as well as to harmless substances that can be released directly to the atmosphere. More specifically, if a gas containing hydrogen cyanide and hydrogen sulfide, for example, is washed with a dilute ammonia solution having solid sulfur suspended therein, the resulting waste washing liquid will contain ammonium thiocyanate, ammonium thiosulfate and the solid sulfur. Ideally, these nitrogen-containing sulfur compounds and sulfur burn in accordance with the following reaction formulas in the absence of water and are consequently converted to sulfur dioxide, carbon dioxide, nitrogen gas and water.

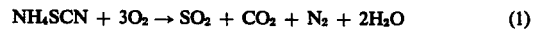

$$NH_4SCN + 3O_2 \rightarrow SO_2 + CO_2 + N_2 + 2H_2O \quad (1)$$

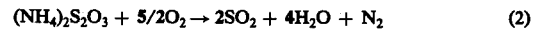

$$(NH_4)_2S_2O_3 + 5/2O_2 \rightarrow 2SO_2 + 4H_2O + N_2 \quad (2)$$

$$S + O_2 \rightarrow SO_2 \quad (3)$$

However, if the nitrogen-containing sulfur compounds are burned in the absence of water as shown by the formulas (1) and (2), fairly great amounts of nitrogen oxides will be formed. Notwithstanding this, the inventors found that if ammonium thiocyanate, ammonium thiosulfate and like nitrogen-containing sulfur compounds are burned in the form of aqueous solution, the amounts of the resulting nitrogen oxides can be greatly reduced as compared with the case where ammonium thiocyanate and ammonium thiosulfate are burned in the absence of water. This fact can be clearly seen from Table 1 below, which also shows burning results of hydrogen cyanide gas and ammonia gas.

Table 1

| Sample | Combustion temp. (° C) | Amount of NOx formed (g-NO)[1] | Rate of formation[2] of NOx relative to N in sample (%) |
|---|---|---|---|
| HCN (gas) 23 g | 1080 | 6.72 | 25.3 |
| NH$_3$ (gas) 30 g | 1080 | 7.18 | 13.6 |
| NH$_4$SCN (solid) 10.5 g | 1060 | 0.114 | 1.38 |
| NH$_4$SCN (60% Aq.Soln.) 32 g[3] | 1060 | 0.0804 | 0.32 |
| (NH$_4$)$_2$S$_2$O$_3$ (solid) 27 g | 1070 | 0.171 | 1.56 |
| (NH$_4$)$_2$S$_2$O$_3$ (30% Aq. Soln.) 24 g[3] | 1070 | 0.0467 | 0.48 |

Note:
[1] "g-NO" stands for NOx calculated as NO and expressed in gram.
[2] The amount of air for combustion is 1.5 times the stoichiometric amount.
[3] Solid weight.

The inventors further found that the amounts of the nitrogen oxides to be produced can be far more reduced, when the nitrogen-containing sulfur compounds are burned in the form of aqueous solution in a furnace by charging the air into the furnace at two or more stages, for example by supplying not more than the stoichiometric amount of the air to the furnace to reduce and decompose the nitrogen-containing sulfur compound and then supplying the excess of the air to the furnace for complete burning. The reason why such remarkable effect can be attained is not clear as yet. Presumably it will be attributable to the fact that even if nitrogen oxides are produced they would be converted into nitrogen in accordance with the following reaction aquations involved, for example, when aqueous solution of ammonium thiocyanate is burned.

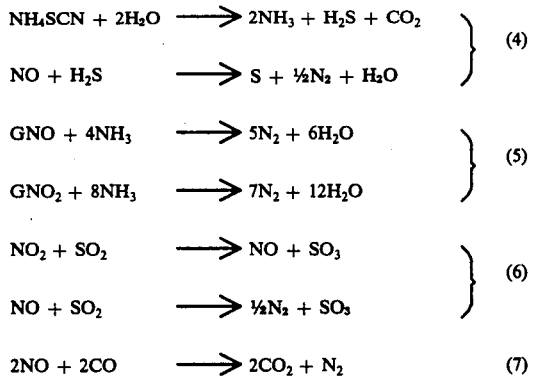

The present invention has been accomplished based on the above new findings. Since the harmful components fixed as nitrogen-containing sulfur compounds in the gas washing liquid are burned along with liquid, any water pollution can be eliminated which would otherwise be caused by the effluent. Furthermore, the present invention achieves an outstanding effect that the formation of nitrogen oxides is materially inhibited during the combustion of the nitrogen-containing sulfur compounds.

The gases to be purified according to the present process include various gases containing hydrogen cyanide and/or hydrogen sulfide. Generally, such harmful components are contained in fuel gases, especially those produced by coking of coals and cracking of oils, and in various waste gases from industries. These gases can be effectively purified by the process of this invention.

According to this process, a gas to be purified is first washed with a circulating aqueous medium to give various nitrogen-containing sulfur compounds depending on the kinds of harmful components contained in the gas.

1. In the case of a gas containing hydrogen sulfide only, the gas is washed with an ammonia solution of a known desulfurizing catalyst, whereby the hydrogen sulfide is fixed as colloidal sulfur and ammonium thiosulfate. Examples of the desulfurizing catalyst are aromatic polynitro compounds such as picric acid, metanitrophenol, 1,3,5-trinitrobenzoic acid, 1,3-dihydroxy-2,4,6-trinitrobenzene and the like, aromatic polyoxy compounds such as hydroquinone, 2,6- or 2,7-antbraquinone disulfonic acid, 1,4-naphthoquinone-2-sulfonic acid, etc.

II. For the treatment of a gas containing both hydrogen sulfide and ammonia, the gas is washed with a solution of a known desulfurizing catalyst the same as in the paragraph (I) above, whereby part of the ammonia is dissolved into the solution to turn the same alkaline, permitting the hydrogen sulfide to be fixed in the solution in the form of colloidal sulfur and ammonium thiosulfate.

III. A gas containing hydrogen cyanide and hydrogen sulfide is washed with an alkaline solution of a known desulfurizing catalyst as given in the paragraph (I) above to fix the hydrogen sulfide as colloidal sulfur and as thiosulfate. The colloidal sulfur thus produced in the turn fixes the hydrogen cyanide in the form of thiocyanate in the solution.

IV. In the case of a gas containing ammonia conjointly with hydrogen cyanide and hydrogen sulfide, the gas is washed with a solution of a known desulfurizing catalyst the same as in the paragraph (I) above, causing part of the ammonia to dissolve into the solution to turn the solution alkaline, whereby the hydrogen sulfide is converted to solid sulfur and ammonium thiosulfate, while the hydrogen cyanide is fixed in the solution as ammonium thiocyanate.

V. In the case of a gas containing hydrogen cyanide only, the gas is washed with an alkaline suspension of solid sulfur to fix the hydrogen cyanide in the forms of thiocyanate. Further the solid sulfur is converted into thiosulfate. The suspension preferably contains solid sulfur at a concentration of 0.1 to 50 g/l, particularly of 10 to 20 g/l. It is preferable that the solid sulfur be as small as possible in particle size. Use of colloidal sulfur having particle sizes of up to 10 microns assures particularly good results in removing hydrogen cyanide.

VI. If a gas containing hydrogen cyanide further contains ammonia conjointly therewith, the gas is washed with a suspension of solid sulfur, which causes part of the ammonia to dissolve into the suspension, rendering the suspension alkaline and fixes the hydrogen cyanide as ammonium thiocyanate in the suspension. Part of the solid sulfur is converted into ammonium thiosulfate. The concentration of sulfur in the suspension and particle size of sulfur may be the same as in the paragraph (V) above.

Through the above treating methods (I) to (VI) the washing of gases can be conducted in the known manner as by contacting the solution or suspension with the gas in a countercurrent or parallelcurrent fashion or by blowing the gas into the solution or suspension with stirring. The alkaline solution or suspension used for washing has preferably a pH of at least 7.5, particularly of 8 to 10.

The resulting aqueous medium having the nitrogen-containing sulfur compounds fixed therein as above is then burned as such or after pre-concentration. The concentration of the nitrogen-containing sulfur compounds in the aqueous medium to be burned may somewhat vary with the kinds of the sulfur compounds, burning conditions and the like. Generally, it is preferable that the concentration be about 5 to 80% by weight, more preferably 50 to 70% from the viewpoint of burning efficiency and inhibition of formation of nitrogen oxides ($NO_x$).

The aqueous liquid with the nitrogen-containing sulfur compounds is burned advantageously in the following manner. The aqueous liquid is supplied, for example by spraying, to a combustion furnace maintained at a predetermined temperature. It is preferable that the temperature within the furnace be usually about 800° to 1300° C, most advantageously about 1100 to 1200° C. At temperatures below 800° C, the fixed nitrogen-containing sulfur compounds will not be burned completely, whereas if the interior temperature exceeds 1300° C, an increase in the amount of $NO_x$ will result, hence objectionable. The air may be supplied to the furnace at one stage or at two or more stages as at a front end and center portion of the furnace. To assure perfect decomposition of the nitrogen-containing sulfur compounds, the total amount of air must be at least the stoichiometric amount and may preferably be a slightly excess amount of 1.1 to 1.5 times the stoichiometric amount. A further excess amount of air is objectionable inasmuch as it tends to result in a corresponding increase in the amounts of nitrogen oxides formed. In the case where the air is charged into the combustion furnace at two stages, preferably 0.7 to 1 time the stoichiometric amount of the air is supplied in the vicinity of a liquid supply nozzle at one end of the furnace to reduce and decompose the nitrogen-containing sulfur compounds, and an excess amount of the air is supplied to the furnace at a portion thereof downstream of the gas produced so as to completely decompose and burn the compounds, the total amount of the air supplied being preferably 1.1 to 1.5 times the stoichiometric amount. This is advantageous in assuring complete decomposition of the nitrogen-containing sulfur compounds and inhibiting formation of $NO_x$.

Further an inner portion of the combustion furnace downstream of the produced gas may be packed with a refractory material as of alumina or silica to achieve a heat accumulating effect and to thereby ensure more complete combustion of the nitrogen-containing sulfur compounds and inhibit formation of $NO_x$. If the concentration of the nitrogen-containing sulfur compounds to be sprayed into the combustion furnace is generally in excess of 70%, the initial temperature within the furnace may be set at 800° C or higher, this permitting the nitrogen-containing sulfur compounds to burn by themselves to eliminate the need for a fuel. However, if the concentration of the nitrogen-containing sulfur compounds is lower than 70%, it is desired to feed the liquid to the furnace after concentration or to feed the same along with a combustion promoting agent such as fuel oil, fuel gas or the like.

The combustion furnace continuously discharges sulfur dioxide, water vapor, nitrogen gas, oxygen gas and the like, although the kinds of the gaseous products may somewhat vary depending on the kind of nitrogen-containing compounds burned. The discharged gases are subjected to catalytic oxidation in usual manner for example in a reactor and are then led to a condenser where sulfur dioxide is recovered as sulfuric acid, and the other gases are released to the atmosphere. Alternatively, the discharged gases are conducted to a usual exhaust gas desulfurizer, for example, to a lime washing tower to recover sulfur dioxide in the form of a calcium sulfite, with the other gases released to the atmosphere.

In this way, the harmful components in unrefined gases are completely removed and recovered in a useful form.

For a better understanding of the advantages of the present invention, the present process will be described below with reference to the attached drawings.

Figure 2:
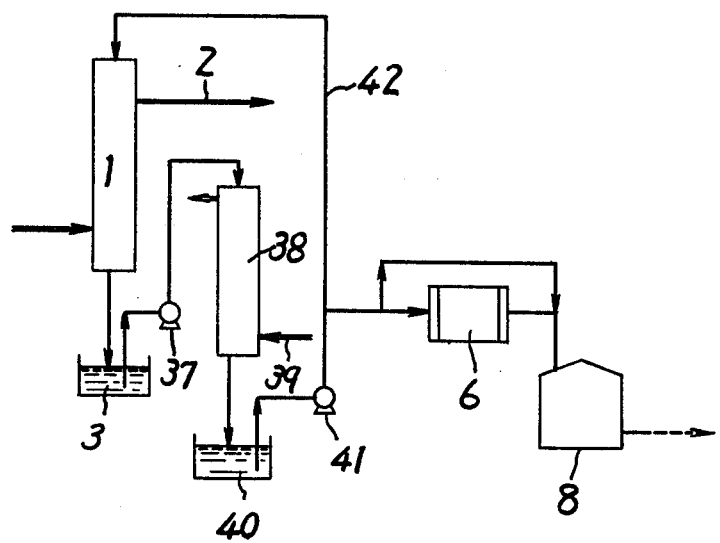

FIGS. 1 and 2 are flow diagrams showing different modes of practicing this invention.

The flow diagram shown in FIG. 1 is particularly suitable for the purification of gases containing hydrogen cyanide. A gas supplied to an absorption tower 1 of the gas-liquid countercurrent type is washed with an alkaline suspension of solid sulfur that is recycled by way of a tank 3, whereby hydrogen cyanide is fixed as thiocyanate and part of solid surface as thiosulfate e.g. ammonium thiocyanate and ammonium thiosulfate. The resulting purified gas is sent through a line 2 to a storage tank (not shown). Since the ability of the suspension to fix hydrogen cyanide reduces in corresponding relation to the concentration of the thiocyanate and thiosulfate in the suspension, it is desired to draw off part of the suspension from the tank 3 while supplying a fresh sulfur suspension prepared by water and solid sulfur S in a tank 4. The drawn-off suspension is led by way of a pump 5 to a filter press 6, where solid sulfur is separated from the suspension and returned to the tank 4 through a line 7. The filtrate is sent to a tank 8. The suspension from the tank 3 may alternatively bypass the filter press 6 to be conducted directly to the tank 8. The liquid is then sent from the tank 8 to a steam heater 11 (heat exchanger) through a pump 9 and line 10, and is thereafter supplied to a concentration tower 12, from the bottom of which a concentrated liquid is run off and forced into a tank 16 by means of a pump 13 through a line 15. A part of the liquid is returned to the concentration tower 12 by the pump 13 through the line 14. The vapor generated in the concentration tower 12 is condensed by a cooler 17 and fed to a vapor-liquid separator 18 for separation. The separated gas is returned through a line 19 to the absorption tower 1, and the liquid to the tank 3 through a line 20. This assures advantageous material balance and prevents release of harmful substances from the system, hence desirable. The concentrated liquid in the tank 16 is sprayed into a combustion furnace 22 by way of pump 21. If the concentration of the nitrogen-containing sulfur compound in the concentrated liquid is not lower than about 70%, combustion will proceed only by blowing air into combustion furnace 22 by means of blower 23 or blowers 23 and 24 while the furnace is maintained at an initial temperature of at least 800° C, whereby the nitrogen-containing sulfur compound will be decomposed completely. However, if the concentration of the nitrogen-containing sulfur compound is lower than 70%, there may be a need to introduce fuel oil, coal gas or like combustion promoting agent through a line 25. The sulfur dioxide, carbon dioxide, water vapor, nitrogen gas, oxygen gas, etc. produced in the combustion furnace 22 are led to a waste heat boiler 26 for the recovery of heat and then sent to a dust filter 27 for the removal of solids. The gas from the dust filter 27 is guided to a reactor 28, where sulfur dioxide is catalytically oxidized. Subsequently, the product is sent through a line 29 to a condenser 30, where sulfuric acid is formed. After sent to a heat exchanger 32 by a pump 31 for cooling, a majority of the acid is returned to the condenser 30 while the acid produced by condensation in the condenser 30 is collected in a tank 33. The gases exhausted from the condenser 30 such as carbon dioxide, nitrogen gas, oxygen gas and the like may be released to the atmosphere but, if necessary, the gases may preferably be passed through a washing tower 34 and a Cottrell precipitator 35 and finally discharged through a chimney 36.

FIG. 2 shows part of a flow diagram especially suitable for the purification of gases containing hydrogen sulfide and gases containing hydrogen sulfide and hydrogen cyanide. A gas containing hydrogen sulfide supplied to an absorption tower 1 is washed with an ammonia solution of desulfurizing catalyst recycled by way of a tank 3, whereby hydrogen sulfide is converted to solid sulfur and ammonium thiosulfate. If the gas further contains hydrogen cyanide, the sulfur thus produced converts the hydrogen cyanide to thiocyanate. Since the desulfurizing catalyst in the solution is reduced when the hydrogen sulfide is converted to solid sulfur, the solution is sent from the tank 3 through a pump 37 to a regenerator 38 for contact with air supplied through a line 39 to oxidize the desulfurizing catalyst for regeneration. The solution led from the regenerator 38 into the tank 40 is recycled to the absorption tower 1 by a pump 41 through line 42 so as to be used for the washing of the gas. Part of the solution is sent to a filter press 6. Treatment is thereafter conducted in the same manner as in FIG. 1.

Examples are given below to clarify the reaftures of this invention. The percentages in the examples are by weight unless otherwise indicated.

EXAMPLE 1

Coal gas containing 2 g/Nm³ of HCN, 5 g/Nm³ of $H_2S$ and 9 g/Nm³ of $NH_3$ was supplied at a rate of 33,000 Nm³/h to a contact tower of the gas-liquid countercurrent type, in which the gas was washed with 360 m³/h of a circulating aqueous solution (having an initial pH of about 7.0 which increased to 8.7 to 9.0 due to contact with the gas) containing suspended therein 2% of solid sulfur about 2 microns in average particle size, whereby 200 g/l of ammonium thiocyanate, 80 g/l of ammonium thiosulfate and 10 g/l of solid sulfur were fixed in the solution. Subsequently, the suspension containing fixed nitrogen-containing sulfur compounds and sulfur was fed to a filter press for separation of sulfur. The resulting filtrate was then concentrated to a concentration of 70% with respect to the sulfur compounds. The concentrated liquid was sprayed at a rate of 16 l/h into a combustion furnace packed, to an extent of 50% by volume, with refractory articles of the alumina type measuring 20 mm × 20 mm × 20 mm. Air was introduced into the furnace at a rate of 40 m³/h in one stage and the temperature in the interior of the furnace was 820° C. The gas exhausted from the combustion furnace at a rate of about 60 Nm³/h was found to be composed of 4.5% of $SO_2$, 3.9% of $CO_2$, 29.2% of $H_2O$, 60% of $N_2$, 2.4% of $O_2$ and 126 p.p.m. of $NO_x$. None of HCN and $NH_3$ were detected in the exhausted gas. The gas exhausted from the combustion furnace was cooled to 500° C and passed through a reactor filled with a $V_2O_5$ catalyst, whereby 98% of $SO_2$ was converted to $SO_3$. By cooling the $SO_3$ to 30° C, 48% sulfuric acid was recovered at a rate of 25 kg/h.

EXAMPLE 2

The same coal gas as used in Example 1 was washed in the same manner as in Example 1 to obtain a solution containing ammonium thiocyanate, ammonium thiosulfate and solid sulfur, which was then sprayed at a rate of 33 l/h into the same combustion furnace as in Example 1. At the same time the furnace kept at 1040° C was supplied with air at 145 m³/h in one stage and boiler fuel oil at 7 l/h. The combustion gave an exhaust gas at a rate of about 160 Nm³/h, the composition of the gas being 1.8% of $SO_2$, 9.6% of $CO_2$, 4.2% of $O_2$ and 110 p.p.m. of $NO_x$ calculated as a dry gas. Subsequently, the exhaust gas from the combustion furnace was cooled to 80° C and washed with 5 m³/h of a 10% calcium hydroxide solution in a reactor of the gas-liquid countercurrent contact type packed with Raschig rings 25 mm in height × 25 mm in diameter, whereby $CaSO_3$ was recovered at a rate of about 5 kg/h.

EXAMPLE 3

A solution containing ammonium thiocyanate, ammonium thiosulfate and solid sulfur obtained in the same manner as in Example 1 was burned in the same manner as in Example 2 except that air was introduced into the furnace in two stages. First 95 m³/h of air was supplied in the vicinity of the solution-spraying nozzle at 1020° C to decompose the nitrogen-containing compounds, and then 50 m³/h of air was supplied to the furnace at 1050° C for complete burning. $NO_x$ contained in the exhaust gas was only 65 p.p.m.

EXAMPLE 4

Coal gas containing 4 g/Nm³ of $H_2S$ and 8 g/Nm³ of $NH_3$ was fed at a rate of 10,000 Nm³/h to a contact tower of the gas-liquid countercurrent type measuring 3,500 mm in diameter and 22,000 mm in height and was washed with 200 m³/h of a circulating 0.1% aqueous solution of picric acid. After washing the coal gas, the aqueous solution of picric acid was sprinkled from the top of a regenerator measuring 3,000 mm in diameter and 15,000 mm in height for contact with air through spontaneous ventilation. The picric acid thus regenerated by oxidation was led to the contact tower again and circulated for use. At equilibrium, the circulating liquid had a pH of 8.7 and was found to be composed of 95 g/l of $(NH_4)_2S_2O_3$, 5.5 g/l of free ammonia, 15 mg/l of free hydrogen sulfide and 28 g/l of solid sulfur. The circulating liquid was sprayed at a rate of 30 l/h into the same combustion furnace as in Example 1 maintained at 1170° C. At the same time, air was supplied to the furnace at a rate of 230 m³/h in one stage and boiler fuel oil, at 17 l/h. The exhaust gas from the combustion furnace was found to be composed of 11.6% of $CO_2$, 0.7% of $SO_2$, 5.2% of $O_2$ and 98 p.p.m. of $NO_x$. In the same manner as in Example 2, $CaSO_3$ was recovered from the exhaust gas at a rate of 7.5 kg/h.

EXAMPLE 5

An aqueous liquid containing ammonium thiosulfate, free ammonia and free hydrogen sulfide obtained in the same manner as in Example 4 was burned in the same manner as in Example 4 except that air was charged into the furnace in two stages. First 160 m³/h of air was supplied to the furnace at 1120° C and then 70 m³/h of air was supplied to the furnace at 1180° C. $NO_x$ contained in the exhaust gas was only 46 p.p.m.

EXAMPLE 6

In a reactor of the gas-liquid countercurrent contact type packed with Raschig rings 25 mm in height × 25 mm in diameter and measuring 800 mm in diameter and 3,000 mm in height, 100 m³/h of waste gas composed of 1 g/Nm³ of HCN with the balance of air was washed with 1 m³/h of a 5% sulfur suspension adjusted with NaOH to a pH of 10.0, whereby 200 g/l of NaSCN and 120 g/l of $Na_2S_2O_3$ were produced in the suspension. The suspension was then sprayed at a rate of 20 l/h into the same furnace as in Example 1 to effect combustion and decomposition at 1150° C while supplying air at a rate of 150 m³ in one stage and boiler fuel oil at 10 l/h. The exhaust gas from the combustion furnace was found to be composed of 1.2% of $SO_2$, 11.8% of $CO_2$, 3.9% of $O_2$ and 86 p.p.m. of $NO_x$. No HCN was detected. The exhaust gas was washed with 2 m³/h of a 15% sodium hydroxide solution, whereby $Na_2SO_3$ was recovered at a rate of about 11.8 kg/h.

What is claimed is:

1. A method of removing HCN from a gas containing same without causing environmental pollution which comprises contacting said gas with an aqueous alkaline ammoniacal solution containing a suspension of solid sulfur to fix said HCN in said aqueous alkaline ammoniacal solution as ammonium thiocyanate, said solution having a concentration of 5 to 85% by weight of ammonium thiocyanate, burning said solution containing said ammonium thiocyanate by spraying said solution into a furnace maintained at a temperature of from 800° to 1300° C in the presence of oxygen in an amount of from 1.0 to 1.5 times the stoichiometric amount, said oxygen being charged into said furnace as air at least two stages thereof, to provide a sulfur dioxide containing gas essentially free of nitrogen oxides, recovering sulfur dioxide from said sulfur dioxide containing gas and exhausting the remaining gas to the atmosphere.

2. An improved method according to claim 1 wherein said concentration is from 50 to 70% by weight.

3. An improved method according to claim 1 wherein the temperature in said furnace is from 1100° C to 1200° C.

4. An improved process according to claim 1 wherein 0.7 to 1.0 time the stoichiometric amount of the air is supplied at the first stage and an excess amount at the second stage, the total amount of the air supplied being 1.1 to 1.5 times the stoichiometric amount.

5. An improved process according to claim 1 wherein a part of the furnace is packed with a refractory material.

6. An improved process according to claim 1 wherein the sulfur dioxide formed in the process is converted into sulfuric acid, sulfate, or sulfite.

7. An improved process according to claim 1 wherein said HCN containing gas also contains hydrogen sulfide.

8. An improved process according to claim 1 wherein said aqueous alkaline ammoniacal solution is at a pH of at least 7.5.

9. An improved process according to claim 1 wherein said exhaustion gas is washed and residual solids removed prior to the release of said gas to the atmosphere.

* * * * *